(No Model.)

E. D. ROCKWELL.
CLAMP FOR BICYCLE BELLS.

No. 524,840. Patented Aug. 21, 1894.

WITNESSES:
A. D. Harrison
Rollin Abell.

INVENTOR:
E. D. Rockwell

UNITED STATES PATENT OFFICE.

EDWARD D. ROCKWELL, OF BRISTOL, CONNECTICUT, ASSIGNOR TO THE NEW DEPARTURE BELL COMPANY, OF SAME PLACE.

CLAMP FOR BICYCLE-BELLS.

SPECIFICATION forming part of Letters Patent No. 524,840, dated August 21, 1894.

Application filed March 26, 1894. Serial No. 505,093. (No model.)

*To all whom it may concern:*

Be it known that I, EDWARD DAYTON ROCKWELL, of Bristol, in the county of Hartford and State of Connecticut, have invented certain new and useful Improvements in Clamps for Bicycle-Bells, of which the following is a specification.

This invention has relation to clamps generally for attaching certain devices or contrivances to other devices or things, and in its preferred form it is particularly adapted for employment in attaching bicycle bells to the handle-bar or other suitable part of the wheel frame.

It is the object of the invention to provide a clamp of the kind and for the purpose mentioned, which shall be particularly adapted for use in connecting a bell with and supporting it upon a bicycle-arm in such manner as not to mar the arm; to have the construction such that it may be readily adjusted or suited to arms of different size; render the clamp and its immediate connections duplicable, so that in case of breakage, repairs can be made readily and cheaply; and to provide a means of attachment and mode of adjustment which it may be practicable for a bicycle rider to practice and employ with the small kit of tools carried with the machine.

To these ends the invention consists of the parts and combination of parts hereinafter mentioned and claimed whereby the before-mentioned objects are attained, the invention not being confined to the precise form of means chosen for describing the construction and mode of operation of the improvement.

Reference is to be had to the annexed drawings and to the letters marked thereon, forming a part of this specification, the same letters designating the same parts or features, as the case may be, wherever they occur.

Figure 1:
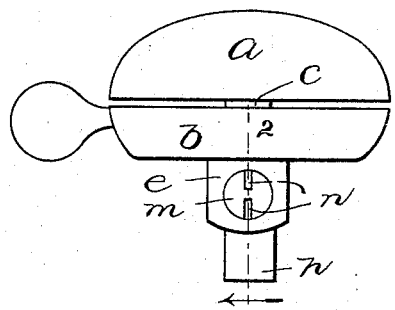
Figure 2:
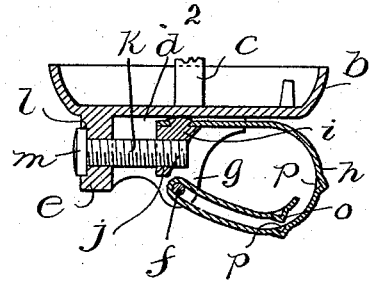
Figure 3:
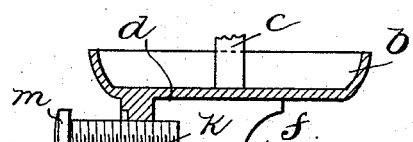
Figures 4, 6:
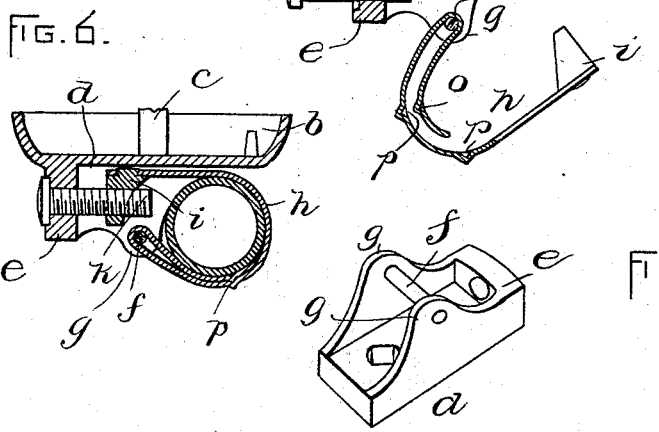
Figure 5:
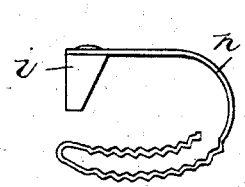

Of the drawings—Figure 1 is a front view of a bicycle-bell complete, constructed in accordance, and equipped, with my improvement, the means shown for operating the bell being no part of the invention claimed. Fig. 2 shows a sectional form of one form of bell base to which the invention is applicable, the latter being represented in full in one form of its embodiment. Fig. 3 is a view somewhat similar to Fig. 2, but indicating, in addition, a mode in which the clamp, *per se*, may be made as a separate part of the bell and may be readily rendered attachable to, and detachable from the bell. Fig. 4 shows in perspective view a detachable bell-base bracket which may be used in connection with my invention. Fig. 5 shows a modified form of adjustable clamp adapted for use in connection with my invention. Fig. 6 shows a sectional view of the invention as applied to a bicycle arm.

In the drawings—$a$ designates the bell proper, $b$ is the base for supporting the bell and other parts of the device, the bell being connected with and supported from, the base by means of a standard, $c$, or other suitable contrivance.

$d$ is a bracket integrally connected with the bottom of the base, $b$, as shown in Figs. 2 and 3, or made as a separate part, as represented in Fig. 4, whereby it may be detachably connected with the base by means of screws or otherwise, as is obvious from an inspection of the last-mentioned figure. The bracket, $d$, is provided with a dependent or projecting part, $e$, and a pin or bar, $f$, extending between ears, $g$.

$h$ is the clamp which is composed by preference of a strip of flexible, resilient sheet metal or other suitable material, to one end of which there is connected a block or head, $i$, through which there is formed a screw-threaded hole, $j$, for the reception of the shank, $k$, of a screw, which passes through a plain unthreaded hole formed in the projection, $e$, of the bracket. The said projection, $e$, is provided with a countersink, $l$, for the reception of the head, $m$, of the screw, so that there shall be no projecting parts to harm, or catch upon the clothing of, the user. The screw has formed in its head recesses, $n\ n$, for the reception of a split key, so that the clamp cannot be readily tampered with by means of a screw-driver, wrench, or other device readily at command.

The end or part of the clamp opposite to that to which the block or head, $i$, is connected is bent over or doubled upon itself, as shown, so as to form, as it were, a loop so that the said loop may be engaged with the pin, $f$, as represented in Fig. 3, with the said pin resting in the bight of the loop. The block or head, $i$, may now be turned up into position between the ears, $g$, and be engaged by the shank, $k$, of the screw, as shown in Fig. 3.

The parts forming the loop of the clamp are provided, the one with projections, $o$, and the other with recesses or openings, $p$, so that when said parts are brought together on a bicycle handle, as shown in Fig. 6, they will be locked or connected so that one may not slip upon the other when the clamp is tightened, as will be readily understood.

Instead of forming one of the parts of the loop with projections and the other part with recesses or apertures, both parts may be correspondingly corrugated, as shown in Fig. 5.

After the clamp is engaged with the handle-bar, the screw can be engaged therewith, and the slack of the clamp taken up by the draft of the screw on the end to which the block, $i$, is attached. If the full draft which the screw is able to exert does not take up all of the slack and tighten the clamp on the bar with the requisite degree of tightness, the loop may be rebent so as to shorten the length between the bight and the head, $i$.

By making the clamp removable it can be exchanged in case of needed repair for a new one without considerable expense or trouble, and the same may be said of the bracket, $d$.

It is to be noted that the clamp can be attached to the handle-bar without marring the same, and the work of attaching and detaching the invention can be accomplished with the utmost readiness and ease.

Though the invention is set forth as for use in connection with bicycles and bicycle bells, it is obvious that it may be used in other connections, and I therefore do not limit myself to the use stated.

Having thus described the invention, what I claim as new, and desire to secure by Letters Patent, is—

A clamp for bicycle bells consisting of a flexible metallic strip provided at one end with a loop, and at the other end with a screw-threaded hole, in combination with a bracket provided with a pin to engage the bight of the loop, and a screw to engage and draw upon the head, the parts of the loop being provided with projections and depressions to prevent one part from slipping upon the other.

In testimony whereof I have signed my name to this specification, in the presence of two subscribing witnesses, this 19th day of March, A. D. 1894.

EDWARD D. ROCKWELL.

Witnesses:
 M. BENJAMIN HOLDEN,
 ROGER S. NEWELL.